United States Patent [19]
Johnson

[11] 3,799,229
[45] Mar. 26, 1974

[54] LOCKING THREAD FASTENER
[75] Inventor: Lawrence D. Johnson, Rockford, Ill.
[73] Assignee: Keystone Consolidated Industries, Inc., Peoria, Ill.
[22] Filed: Oct. 26, 1971
[21] Appl. No.: 191,987

[52] U.S. Cl............................................. 151/14 R
[51] Int. Cl.............................................. F16b 39/30
[58] Field of Search........ 151/14 R, 22, 21 B, 21 C, 151/21 A; 10/10 R, 27, 86 A; 85/46

[56] References Cited
UNITED STATES PATENTS
| | | | |
|---|---|---|---|
| 2,377,405 | 6/1945 | Davies | 151/14 R |
| 2,383,231 | 8/1945 | Anderton | 151/14 R |
| 2,842,180 | 7/1958 | Brown et al. | 151/22 |
| 3,097,728 | 7/1963 | Yocum | 151/14 R X |
| 3,454,070 | 7/1969 | Phipard | 151/22 |

Primary Examiner—Ramon S. Britts
Attorney, Agent, or Firm—Molinare, Allegretti, Newitt & Witcoff

[57] ABSTRACT

A locking thread fastener for use in a mating part having a conventional internal thread where the thread of the fastener has a varying pitch distance along the length of the screw so that interference is encountered on the flanks of the thread when the fastener is driven into the mating part. The pitch distance varies in an oscillating manner between maximum and minimum values.

14 Claims, 7 Drawing Figures

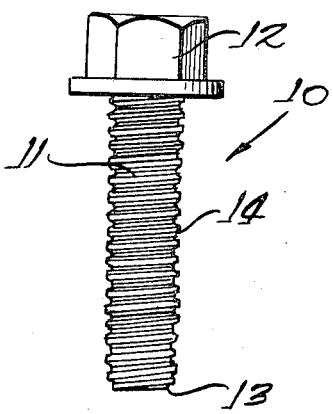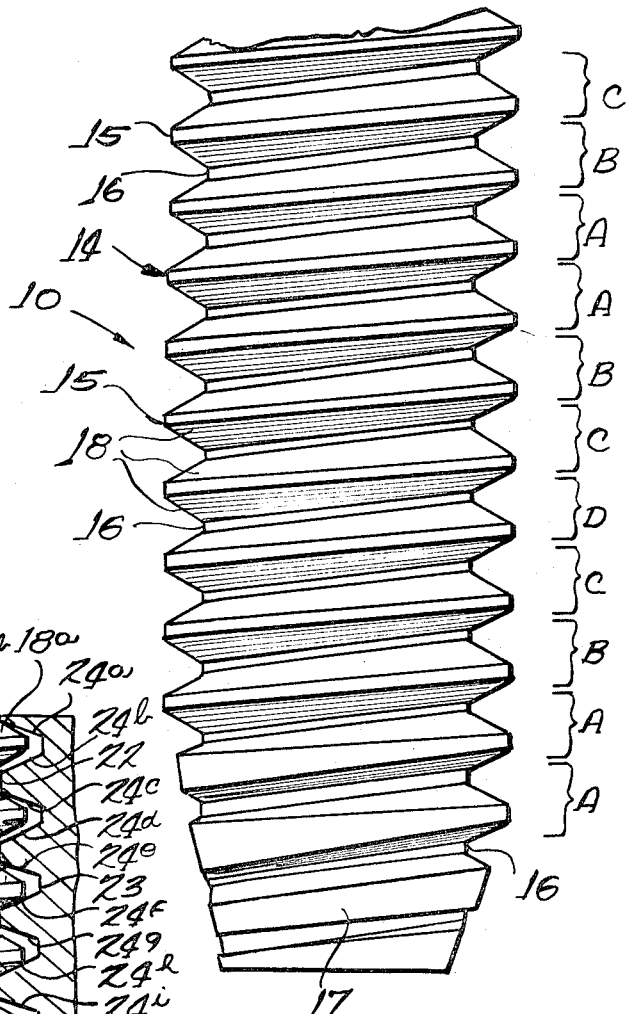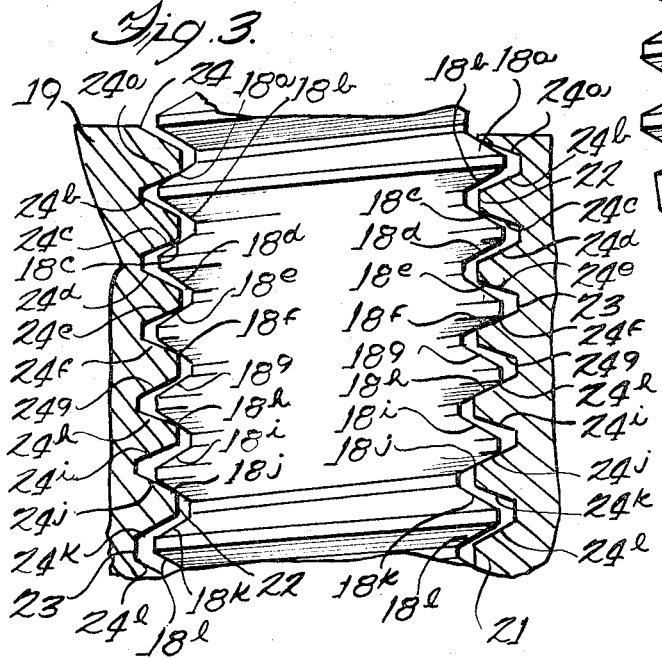

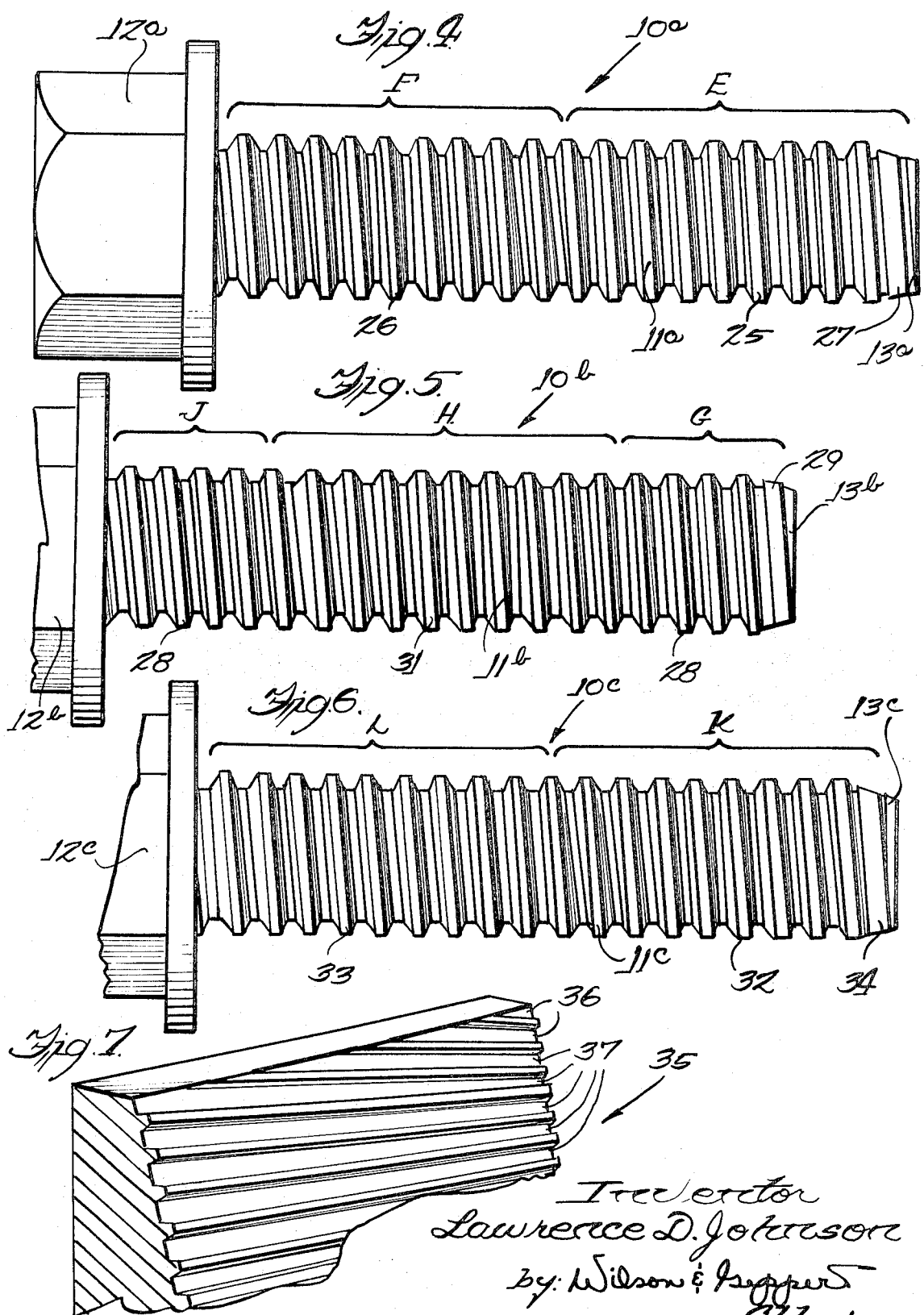

ns and capabilities as will later more fully appear
and are inherently possessed thereby.

In the drawings:

FIG. 1 is a side elevational view of a locking screw employing the locking thread of the present invention.

FIG. 2 is an enlarged partial side elevational view of the screw shank showing the locking thread.

FIG. 3 is an enlarged fragmentary vertical cross sectional view of a mating part receiving the screw with the screw shank shown in side elevation and showing the thread interference therebetween.

FIG. 4 is an enlarged side elevational view of a second embodiment of locking screw having locking threads adjacent the screw head.

FIG. 5 is an enlarged side elevational view of a third embodiment of locking screw having locking threads on an intermediate portion of the screw shank.

FIG. 6 is an enlarged side elevational view of a fourth embodiment of locking screw having locking threads at the entering end of the screw.

FIG. 7 is an enlarged partial perspective view of a die for roll forming the thread onto the screw.

Referring more particularly to the disclosure in the drawing wherein is shown an illustrative embodiment of the present invention, FIG. 1 discloses a locking screw 10 having a shank 11 with an enlarged driving head 12 at one end and a slightly tapered free end 13. The screw shank 11 has a locking thread 14 thereon as more clearly shown in FIGS. 2 and 3.

As seen in FIG. 2, the screw thread 14 extends from the enlarged head 12 to the tapered end 13 with the thread crest 15 and thread root 16 being of constant diameters throughout. At the tapered tip, the root 16 remains constant while the thread crest decreases at 17 providing a flattened crest to aid in aligning the screw in a mating part to be later described.

As shown in FIG. 2, the first two threads have a normal thread pitch as shown at A. The third thread has a slightly shorter pitch shown at B. The fourth thread has a still shorter pitch shown at C, and the fifth thread has the shortest pitch shown at D. Each thread pitch B, C, and D decreases from the previous pitch by a constant distance increment. At this point, the lead or pitch progressively increases by the same distance increment per revolution until the pitch returns to its normal dimension A. Depending on the length of the screw, this process repeats itself through as many cycles until the head 12 is reached. Adjacent the head only a partial cycle may be completed.

Each thread revolution has opposed thread flanks 18 which provide substantially all of the thread interference necessary for a locking action without any significant deformation of the threads 21 in the mating member 19 (see FIG. 3). The mating member 19 is provided with a standard internal thread 21 having a constant pitch or lead throughout; the thread having a crest 22 and root 23, each of a constant diameter. The thread has opposed thread flanks 24 which are in interference with the flanks of the thread 14 on the screw 10.

Viewing the right hand side of the mating member 19 and the screw 10, at the upper portion, the flank $18^a$ of the screw engages the flank $24^a$ of the member, while flanks $18^b$ and $24^b$ are spaced. Flanks $18^c$ and $24^c$ are in lighter engagement while flanks $18^d$ and $24^d$ are closer together. Screw flanks $18^e$ and $18^f$ are substantially equally spaced from the member flanks $24^e$ and $24^f$, screw flank $18^g$ is spaced from member flank $24^g$

LOCKING THREAD FASTENER

SPECIFICATION

The present invention relates to a novel locking screw and more particularly to a screw having a new and novel locking thread.

There are presently available several metallic type locking screws which are utilized in numerous applications where a fastener is required to remain tightly engaged in a member under vibration or other stress. Such types of screws generally involve either a small block of plastic or other resilient material received in an opening or slot formed in the threads of the screw of the threaded opening, a layer of a resilient or plastic material on a localized portion of the threads of a screw or a thread interference generally provided by a lobular screw shank or a deformed thread section of the screw. However, not all of these locking screws perform satisfactorily in all materials because of their design.

Previous locking screws gave inconsistent torque values when testing in like applications with other designs. Also, the design of the other type locking screws cause the material of the mating thread to be distorted substantially. For example, root interference type locking screws cause heavy distortion at the minor diameter of the mating thread when the minor diameter is at its low limit. On the other hand, if the minor diameter is at the high limit, the locking ability of the screw is reduced or lost altogether. The present screw overcomes the above mentioned disadvantages of previous locking screws.

Among the objects of the present invention is the provision of a lovel locking screw which does not require the deformation of the screw or screw threads or the addition of any material to enhance frictional engagement between the screw and the member into which the screw is threaded. This novel screw is provided with its locking characteristics by varying the lead or pitch distance on the screw so that when the screw is driven into the mating part, interference is encountered on the flanks of the thread. A thread dimension has been utilized which has closely controlled tolerances on external as well as internal threads. The lead or pitch distance was chosen because changing it slightly will significantly increase friction with little distortion of the mating thread.

Another object of the present invention is the provision of a novel locking screw having a variable locking thread. This thread has an oscillating pitch distance that increases and decreases between maximum and minimum values. The performance of this type of thread design does not require the minor or major diameter of the mating thread to be held to the high or low limit to obtain uniformity in the prevailing torque for the screw.

A further object of the present invention is the provision of a locking screw having a variable pitch thread where interference occurs between the screw and mating member at or on the flanks of the thread. Therefore, the hardness of the mating thread, although it may vary, does not cause the prevailing torque to wander for the present screw. Also, this thread design creates so little distortion of the mating thread, work hardening of the mating thread is held to a minimum, thus extending the reusability of the screw.

Further objects are to provide a construction of maximum simplicity, efficiency, economy and ease of assambly and operation, and such further objects, advanwhile flank 18$^h$ is in engagement with flank 24$^h$, flank 18$^i$ is spaced from flank 24$^i$ while flank 18$^j$ engages flank 24$^j$, and on the last revolution both flanks 18$^k$ and 18$^l$ are spaced from member flanks 24$^k$ and 24$^l$. Considering the left hand side of the member 19, the flanks of the screw and the member are in engagement or spaced in generally correspondence to those shown in the right-hand side.

Using a No. ¼–20 variable lead screw as an example, the normal pitch or lead (A) is 0.050 inches, and the dimension between threads has been progressively decreased by 0.001 inch per lead. Thus the lead change at the third thread shown in FIG. 2 from the end would be 0.001 inch, with a 0.002 inch change at the fourth thread and a 0.003 inch change at the fifth thread. Thus the dimension B would equal 0.049 inches, C would equal 0.048 inches, and D would equal 0.047 inches. Then the lead would progressively increase by 0.001 inch per revolution until the normal pitch of 0.050 inches were reached and the cycle would then repeat itself.

Although described as an example, I do not wish or intend this example to be limiting on the locking screw as the dimension of the screw and the amount of lead or pitch change can be varied to suit any application or length of screw to obtain the desired locking effect. As the applications for locking screws vary in materials, hardness, etc., both the pitch and pitch change may be altered to provide a usable product.

As the interference for locking the screw 10 in the mating part 19 is created at or on the flanks of the thread, very little distortion in the mating thread occurs. Therefore, the hardness of the mating thread 21, although it may vary, does not cause the prevailing torque to wander for the present screw. Also, as the present thread creates so little distortion of the mating thread, work hardening of the mating thread is held to a minimum, and thus, the reusability of the lock screw is extended. Again, as an example, tests have been made driving a No. ¼–20 lock screw in and out of a standard 2B tapped hole 40 times, and the screw still had a prevailing torque of 3 inch-pounds, which torque or interference is capable of providing effective resistance to small amounts of vibration. However, the prevailing torque when the screw is initially driven into the mating part meets all accepted standards established for prevailing torque type locking screws.

FIGS. 1 through 3 illustrate a locking screw 10 provided with a cyclical locking thread 14 for the length of the screw shank, however, under various applications of the screw, other arrangements of the locking thread can be utilized as shown in FIGS. 4 through 6. As seen in FIG. 4, a second embodiment of locking screw 10$^a$ has a shank 11$^a$ with an enlarged driving head 12$^a$ at one end and a tapered opposite end 13$^a$. On the shank 11$^a$, approximately one-half of the threaded area E employs a conventional screw thread 25 and the remainder F of the shank adjacent the head 12$^a$ has a locking thread 26.

The conventional or standard thread 25 merges into the tapered free end 13$^a$ to provide threads of a progressively flattened crest 27, and the threads 25 may be identical in pitch to the initial or normal thread pitch of the locking thread 26. The locking thread has a substantially identical configuration to that shown in FIG. 2 with the thread pitch decreasing and then increasing by a constant distance increment over one or more cycles depending on the length of the variable pitch thread portion.

FIG. 5 discloses another embodiment of locking screw 10$^b$ having a shank 11$^b$ and a driving head 12$^b$. In this embodiment, a standard screw thread 28 is formed at the free end portion G of the screw and merges into a tapered end 13$^b$ having a progressively flattened crest 29. A central portion H of approximately one-third to one-half of the length of the shank 11$^b$ has one or more cycles of a locking thread 31 thereon, and the standard thread 28 is again formed on the shank portion J adjacent the enlarged driving head 12$^b$. The pitch of the standard thread 28 may be identical to the maximum pitch of the cyclically varying pitch of the locking thread 31. Again, the locking thread 31 has a variable pitch decreasing and increasing by a constant increment between maximum and minimum pitch values, and the variable pitch could be applied for several pitches in length to provide one or more variable pitch cycles such as shown in FIG. 2.

FIG. 6 discloses a fourth embodiment of locking screw 10$^c$ having a shank 11$^c$ and an enlarged head 12$^c$ with a variable pitch locking thread 32 extending for one-third to one-half the length K of the shank 11$^c$ from the tapered end 13$^c$ and then merging into a standard thread 33 of a constant pitch for the remaining portion L of the shank. The locking thread 32 is applied for several pitches in length to provide one or more variable pitch cycles as seen in FIG. 2, and the tapered end 13$^c$ has threads formed thereon of progressively flattened crests 34. Obviously, the locking thread sections 26, 31 and 32 cooperate in the same manner with an internally threaded member as shown in FIG. 3.

FIG. 7 discloses a thread rolling die 35 for use in rolling the standard and/or locking thread onto a screw shank. The die 35 is generally utilized with a second rolling die (not shown) of substantially identical configuration where one die is stationary and the second die is movable. The die 35 has a plurality of grooves 36, 37 corresponding to the thread to be formed, where the grooves 36 would be for standard threads and additional grooves 37 have a variable pitch between maximum and minimum values to provide the locking thread configuration.

To form the screw having the locking threads thereon, a metal rod or wire is drawn to form a shank 11 and the enlarged head 12 is formed at one end. The opposite end 13 is provided with a tapered surface and the screw blank is ready for threading. The blank is placed between the dies, and one die 35 is reciprocated relative to the second die to roll form the threads onto the shank 11 and the partial thread with the flattened crests onto the tapered end 13. Depending on the configuration of the dies, the screw may be formed with the locking thread along the entire length or a portion thereof as disclosed in FIGS. 1, 2 and 4–6.

I claim:

1. A locking thread fastener having a standard helical thread form adapted for assembly with a mating part having a complementary standard internal thread, comprising a fastener shank having a driving head at one end and an opposite free end and having a thread formed thereon with a constant root diameter and a constant crest diameter, the thread on the fastener having at least a portion formed as a locking thread with a variable pitch, the locking thread portion including at least three thread turns with the pitch measured between any two points on adjacent turns thereof being varied from thread to thread and oscillating in a range between maximum and minimum values along the length of the locking thread portion.

2. A locking thread fastener as set forth in claim 1, in which the pitch of the locking threads decreases and increases in a constant increment for each turn of the thread.

3. A locking thread fastener as set forth in claim 1, in which the locking action of the fastener in the mating part occurs along the flanks of the locking screw threads of the assembled parts.

4. A locking thread fastener as set forth in claim 1, in which the variable pitch decreases from the normal thread pitch for at least two revolutions of the fastener thread and then returns to the normal pitch over at least two revolutions of the fastener thread.

5. A locking thread fastener as set forth in claim 4, in which the locking thread pitch decreases by equal increments per revolution over three revolutions of the fastener thread and then increases at the same equal increments per revolution over the succeeding three revolutions to return to the normal thread pitch.

6. A locking thread fastener as set forth in claim 5, in which the locking thread remains at the normal thread pitch for two revolutions before decreasing for the next cycle and is at the minimum pitch for only one revolution of the locking thread.

7. A locking thread fastener as set forth in claim 1, in which the pitch of the locking threads decreases and increases in a constant increment per revolution of the thread, the pitch initially being at its normal value for the initial two thread revolutions, then decreases over three revolutions to its minimum value and then increases over three revolutions to the normal pitch value, the thread remaining at its minimum value for a single revolution and at its maximum normal value for two revolutions before decreasing again in the next cycle.

8. A locking thread fastener as set forth in claim 7, in which thread interference causing locking action between the fastener and its mating part occurs along the flanks of the locking threads.

9. A locking thread fastener as set forth in claim 1, in which said fastener shank includes a tapered free end having threads with flattened crests thereon.

10. A locking thread fastener as set forth in claim 1, in which the locking thread extends along the entire length of the fastener shank.

11. A locking thread fastener as set forth in claim 1, in which the locking thread extends along a portion of the fastener shank and a standard screw thread extends along the remainder of the shank.

12. A locking thread fastener as set forth in claim 11, in which the locking thread portion is formed adjacent a driving head for the fastener and extends for approximately one-third to one-half of the length of the shank.

13. A locking thread fastener as set forth in claim 11, in which the locking thread portion extends for approximately one-third to one-half the length of the shank intermediate the ends of the fastener with a standard screw thread at the ends of the fastener.

14. A locking thread fastener as set forth in claim 11, in which the locking thread portion extends for approximately one-third to one-half the length of the shank at the free end thereof with a standard thread extending from the locking thread portion to the driving head.

* * * * *